US011700500B2

(12) United States Patent
Miyasaka et al.

(10) Patent No.: US 11,700,500 B2
(45) Date of Patent: Jul. 11, 2023

(54) AUDIO COMMUNICATION DEVICE

(71) Applicant: SOCIONEXT INC., Kanagawa (JP)

(72) Inventors: Shuji Miyasaka, Yokohama (JP); Kazutaka Abe, Yokohama (JP); Yasunori Naruse, Yokohama (JP)

(73) Assignee: SOCIONEXT INC., Kanagawa (JP)

( * ) Notice: Subject to any disclaimer, the term of this patent is extended or adjusted under 35 U.S.C. 154(b) by 6 days.

(21) Appl. No.: 17/374,780

(22) Filed: Jul. 13, 2021

(65) Prior Publication Data

US 2022/0086585 A1 Mar. 17, 2022

(30) Foreign Application Priority Data

Sep. 11, 2020 (JP) ................................ 2020-153008

(51) Int. Cl.
*H04S 7/00* (2006.01)
*H04R 27/00* (2006.01)
*H04M 3/56* (2006.01)

(52) U.S. Cl.
CPC .......... *H04S 7/303* (2013.01); *H04S 2420/01* (2013.01)

(58) Field of Classification Search
None
See application file for complete search history.

(56) References Cited

U.S. PATENT DOCUMENTS 10,602,302 B1 * 3/2020 Lyren ...................... G06F 3/011
10,917,737 B2 * 2/2021 Lyren ...................... H04R 5/033
2010/0322428 A1 * 12/2010 Fukui ...................... H04S 7/30 381/17
2013/0236040 A1 * 9/2013 Crawford ................ H04S 7/306 381/310

(Continued)

FOREIGN PATENT DOCUMENTS

JP H11-252699 A 9/1999
JP 2006-237841 A 9/2006

(Continued)

OTHER PUBLICATIONS

Jens Blauert et al., "Spatial Hearing," Kajima Institute Publishing Co., Ltd., pp. 54-59.

*Primary Examiner* — Qin Zhu
(74) *Attorney, Agent, or Firm* — McDermott Will & Emery LLP

(57) ABSTRACT

An audio communication device includes: a sound position determiner that determines sound localization positions for N audio signals in a virtual space having first and second walls; N sound localizers each performing sound localization processing to localize sound in the sound localization position determined by the sound position determiner, and outputting localized sound signals; an adder that sums the N localized sound signals, and outputs a summed localized sound signal. Each sound localizer performs the processing using: a first head-related transfer function (HRTF) assuming that a sound wave emitted from the sound localization (Continued)

position of the sound localizer determined by the sound position determiner directly reaches each ear of a hearer virtually present at the hearer position; and a second HRTF assuming that the sound wave emitted from the sound localization position reaches each ear of the hearer after being reflected by closer one of the first and second walls.

3 Claims, 6 Drawing Sheets

(56) References Cited

U.S. PATENT DOCUMENTS

| | | | | |
|---|---|---|---|---|
| 2014/0016793 | A1* | 1/2014 | Gardner | H04L 65/403<br>709/204 |
| 2020/0037097 | A1* | 1/2020 | Torres | H04S 7/304 |
| 2020/0228911 | A1* | 7/2020 | Baszucki | H04S 3/008 |
| 2021/0258712 | A1* | 8/2021 | Lyren | H04R 5/033 |

FOREIGN PATENT DOCUMENTS

| | | | |
|---|---|---|---|
| JP | 2009-33298 | A | 2/2009 |
| JP | 2013-017027 | A | 1/2013 |

* cited by examiner

AUDIO COMMUNICATION DEVICE

CROSS REFERENCE TO RELATED APPLICATION

The present application is based on and claims priority of Japanese Patent Application No. 2020-153008 filed on Sep. 11, 2020. The entire disclosure of the above-identified application, including the specification, drawings and claims is incorporated herein by reference in its entirety.

FIELD

The present disclosure relates to an audio communication device utilized at a teleconference of a plurality of speakers.

BACKGROUND

Audio communication devices utilized at a teleconference of a plurality of speakers are known (e.g., Patent Literature (PTL) 1).

CITATION LIST

Patent Literature

PTL 1: Japanese Unexamined Patent Application Publication No. 2006-237841

Non Patent Literature

NPL 1: Jens Blauert, Masayuki Morimoto, and Toshiyuki Goto: *Spatial Hearing*, Kajima Publishing

SUMMARY

Technical Problem

At a teleconference, a Web drinking party, or any other event held utilizing an audio communication device, there is a demand for making the participants feel more realistic as if they were meeting face to face.

It is an objective of the present disclosure to provide an audio communication device that gives a more realistic feeling to the participants in a teleconference, a Web drinking party, or any other event held utilizing the audio communication device than a typical audio communication device.

Solutions to Problem

An audio communication device according to an aspect of the present disclosure includes: N inputters, where N is an integer of two or more, each receiving one of N audio signals; a sound position determiner that determines, for the N audio signals input from the N inputters, sound localization positions in a virtual space having a first wall and a second wall; N sound localizers, each associated with one of the N inputters, performing sound localization processing to localize sound in one of the sound localization positions determined for one of the N inputters associated with the sound localizer by the sound position determiner, and outputting one of N localized sound signals; and an adder that sums the N localized sound signals output from the N sound localizers, and outputs a summed localized sound signal. The sound position determiner determines the sound localization positions of the N audio signals to fall between the first wall and the second wall, and to not overlap each other as viewed from a hearer position between the first wall and the second wall. Each of the N sound localizers performs the sound localization processing using: a first head-related transfer function assuming that a sound wave emitted from a sound localization position determined for the sound localizer by the sound position determiner directly reaches each ear of a hearer virtually present at the hearer position; and a second head-related transfer function assuming that the sound wave emitted from the sound localization position reaches each ear of the hearer after being reflected by closer one of the first wall and the second wall.

An audio communication device according to another aspect of the present disclosure includes: N inputters, where N is an integer of two or more, each receiving one of N audio signals; a sound position determiner that determines, for the N audio signals input from the N inputters, sound localization positions in a virtual space; N sound localizers, each associated with one of the N inputters, performing sound localization processing to localize sound in one of the sound localization positions determined for one of the N inputters associated with the sound localizer by the sound position determiner, and outputting one of N localized sound signals; and an adder that sums the N localized sound signals output from the N sound localizers, and outputs a summed localized sound signal. The sound position determiner determines the sound localization positions of the N audio signals to: not overlap each other as viewed from a hearer position; and make, under a condition that a front of a hearer virtually present at the hearer position is zero degrees, a distance between adjacent ones of the sound localization positions including or sandwiching the zero degrees shorter than a distance between adjacent ones of the sound localization positions without including or sandwiching the zero degrees. Each of the N sound localizers performs the sound localization processing using a head-related transfer function assuming that a sound wave emitted from a sound localization position determined for the sound localizer by the sound position determiner directly reaches each ear of the hearer virtually present at the hearer position.

An audio communication device according to further another aspect of the present disclosure includes: N inputters, where N is an integer of two or more, each receiving one of N audio signals; a sound position determiner that determines, for the N audio signals input from the N inputters, sound localization positions in a virtual space; N sound localizers, each associated with one of the N inputters, performing sound localization processing to localize sound in one of the sound localization positions determined for one of the N inputters associated with the sound localizer by the sound position determiner, and outputting one of N localized sound signals; a first adder that sums the N localized sound signals output from the N sound localizers, and outputs a first summed localized sound signal; a background noise signal storage that stores a background noise signal indicating background noise in the virtual space; and a second adder that sums the first summed localized sound signal and the background noise signal, and outputs a second summed localized sound signal. The sound position determiner determines the sound localization positions of the N audio signals to not overlap each other as viewed from a hearer position. Each of the N sound localizers performs the sound localization processing using a head-related transfer function assuming that a sound wave emitted from a sound localization position determined for the sound localizer by the sound position determiner directly reaches each ear of a hearer virtually present at the hearer position.

Advantageous Effects

The audio communication device according to the present disclosure gives a more realistic feeling to the participants in a teleconference, a Web drinking party, or any other event held utilizing the audio communication device.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

Figure 1:
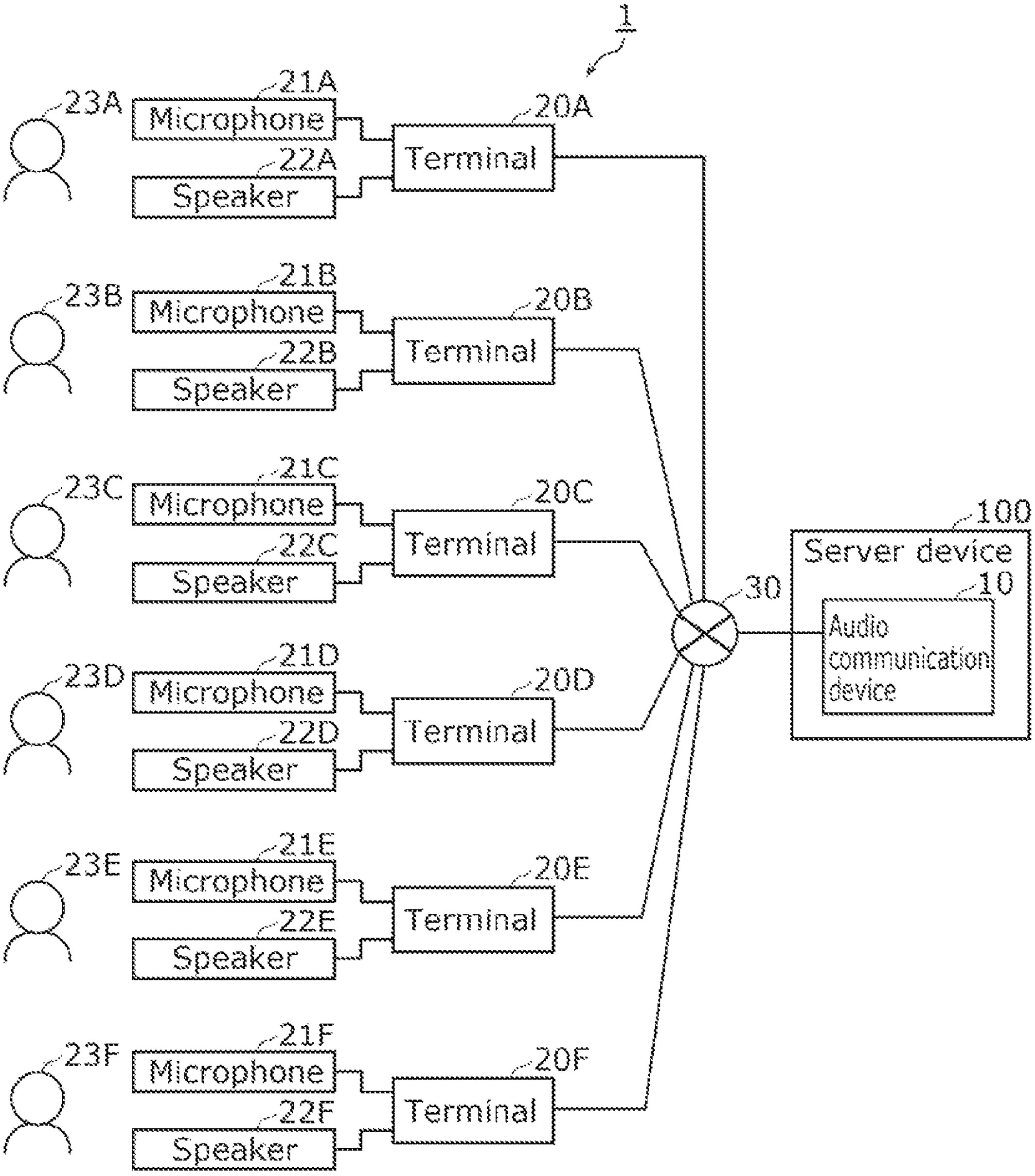
FIG. 1 is a schematic view showing an example configuration of a teleconference system according to Embodiment 1.

Underlying Knowledge Forming Basis of the Present Disclosure With higher speeds and capacities of Internet networks and higher functions of server devices, audio communication devices are used in practice which achieve teleconference systems allowing simultaneous participation from a plurality of points. Such teleconference systems are utilized not only for business purposes but widely utilized for consumer purposes such as Web drinking parties under the influence of recent coronavirus disease 2019 (COVID-19).

With a spread of a teleconference, a Web drinking party, or any other event held utilizing an audio communication device, there is an increasing demand for giving a more realistic feeling to the participants in the teleconference, the Web drinking party, or any other event.

To meet the demand, the present inventors have tested and studied hard to give a more realistic feeling to the participants in a teleconference, a Web drinking party, or any other event held utilizing the audio communication device. As a result, the present inventors have arrived at the following audio communication device.

An audio communication device according to an aspect of the present disclosure includes: N inputters, where N is an integer of two or more, each receiving one of N audio signals; a sound position determiner that determines, for the N audio signals input from the N inputters, sound localization positions in a virtual space having a first wall and a second wall; N sound localizers, each associated with one of the N inputters, performing sound localization processing to localize sound in one of the sound localization positions determined for one of the N inputters associated with the sound localizer by the sound position determiner, and outputting one of N localized sound signals; and an adder that sums the N localized sound signals output from the N sound localizers, and outputs a summed localized sound signal. The sound position determiner determines the sound localization positions of the N audio signals to fall between the first wall and the second wall, and to not overlap each other as viewed from a hearer position between the first wall and the second wall. Each of the N sound localizers performs the sound localization processing using: a first head-related transfer function assuming that a sound wave emitted from a sound localization position determined for the sound localizer by the sound position determiner directly reaches each ear of a hearer virtually present at the hearer position; and a second head-related transfer function assuming that the sound wave emitted from the sound localization position reaches each ear of the hearer after being reflected by closer one of the first wall and the second wall.

The audio communication device described above causes the voices of the N speakers input from the N inputters to sound as if the voices were uttered in the virtual space having the first and second walls. In addition, the audio communication device described above allows a hearer of the voices of the N speakers to relatively easily grasp the positional relationship between the speakers and the walls in the virtual space. Thus, this hearer relatively easily distinguishes the directions from which the voices of the N speakers are coming. Accordingly, the audio communication device described above gives a more realistic feeling to the participants in a teleconference, a Web drinking party, or any other event held utilizing the audio communication device than a typical audio communication device.

Each of the N sound localizers may perform the sound localization processing while allowing a change in at least one of a reflectance of the first wall to the sound wave or a reflectance of the second wall to the sound wave.

Accordingly, the degrees of echoing the voices of the speakers are freely changeable in the virtual space.

Each of the N sound localizers may perform the sound localization processing while allowing a change in at least one of a position of the first wall or a position of the second wall.

Accordingly, the positions of the walls are freely changeable in the virtual space.

An audio communication device according to another aspect of the present disclosure includes: N inputters, where N is an integer of two or more, each receiving one of N audio signals; a sound position determiner that determines, for the N audio signals input from the N inputters, sound localization positions in a virtual space; N sound localizers, each associated with one of the N inputters, performing sound localization processing to localize sound in one of the sound localization positions determined for one of the N inputters associated with the sound localizer by the sound position determiner, and outputting one of N localized sound signals; and an adder that sums the N localized sound signals output from the N sound localizers, and outputs a summed localized sound signal. The sound position determiner determines the sound localization positions of the N audio signals to: not overlap each other as viewed from a hearer position; and make, under a condition that a front of a hearer virtually present at the hearer position is zero degrees, a distance between adjacent ones of the sound localization positions including or sandwiching the zero degrees shorter than a distance between adjacent ones of the sound localization positions without including or sandwiching the zero degrees. Each of the N sound localizers performs the sound localization processing using a head-related transfer function assuming that a sound wave emitted from a sound localization position determined for the sound localizer by the sound position determiner directly reaches each ear of the hearer virtually present at the hearer position.

It is generally known that the difference limen in sound localization is higher at the front of a hearer, and decreases with increasing distances to the right and left (e.g., Non Patent Literature (NPL) 1). In the audio communication device described above, the angles between speakers on the right or left are greater than the angle between speakers at the front, as seen from a hearer. Thus, this hearer relatively easily distinguishes the directions from which the voices of the N speakers are coming. Accordingly, the audio communication device described above gives a more realistic feeling to the participants in a teleconference, a Web drinking party, or any other event held utilizing the audio communication device than a typical audio communication device.

An audio communication device according to further another aspect of the present disclosure includes: N inputters, where N is an integer of two or more, each receiving one of N audio signals; a sound position determiner that determines, for the N audio signals input from the N inputters, sound localization positions in a virtual space; N sound localizers, each associated with one of the N inputters, performing sound localization processing to localize sound in one of the sound localization positions determined for one of the N inputters associated with the sound localizer by the sound position determiner, and outputting one of N localized sound signals; a first adder that sums the N localized sound signals output from the N sound localizers, and outputs a first summed localized sound signal; a background noise signal storage that stores a background noise signal indicating background noise in the virtual space; and a second adder that sums the first summed localized sound signal and the background noise signal, and outputs a second summed localized sound signal. The sound position determiner determines the sound localization positions of the N audio signals to not overlap each other as viewed from a hearer position. Each of the N sound localizers performs the sound localization processing using a head-related transfer function assuming that a sound wave emitted from a sound localization position determined for the sound localizer by the sound position determiner directly reaches each ear of a hearer virtually present at the hearer position.

The audio communication device described above causes the voices of the N speakers input from the N inputters to sound as if the voices were uttered in the virtual space filled with the background noise. Accordingly, the audio communication device described above gives a more realistic feeling to the participants in a teleconference, a Web drinking party, or any other event held utilizing the audio communication device than a typical audio communication device.

The background noise signal stored in the background noise signal storage may include one or more background noise signals. The audio communication device may further include a selector that selects one or more background noise signals out of the one or more background noise signals stored in the background noise signal storage. The second adder may sum the first summed localized sound signal and the one or more background noise signals selected by the selector, and outputs a second summed localized sound signal.

Accordingly, the background noise can be selected in accordance with the ambience of the virtual space to be created.

The selector may change, over time, the one or more background noise signals to be selected.

Accordingly, the ambience of the virtual space to be created is changeable over time.

A specific example of an audio communication device according to an aspect of the present disclosure will be described with reference to the drawings. The embodiments described below are mere specific examples of the present disclosure. The numerical values, shapes, materials, constituent elements, the arrangement and connection of the constituent elements, steps, step orders etc. shown in the following embodiments are thus mere examples, and are not intended to limit the scope of the present disclosure. The figures are schematic representations and not necessarily drawn strictly to scale.

Note that these general and specific aspects of the present disclosure may be implemented using a system, a method, an integrated circuit, a computer program, or a computer-readable recording medium such as a CD-ROM, or any combination of systems, methods, integrated circuits, computer programs, or recording media.

Embodiment 1

Now, a teleconference system which allows a conference of a plurality of participants in different places will be described with reference to the drawings.

FIG. 1 is a schematic view showing an example configuration of teleconference system 1 according to Embodiment 1.

As shown in FIG. 1, teleconference system 1 includes audio communication device 10, network 30, N+1 terminals 20, where N is an integer of two or more, N+1 microphones 21, and N+1 speakers 22. In FIG. 1, terminals 20, microphones 21, and speakers 22 correspond to terminals 20A to 20F, microphones 21A to 21F, and speakers 22A to 22F, respectively.

Microphones 21A to 21F are connected to terminals 20A to 20F, respectively. Microphones 21A to 21F convert the voices of users 23A to 23F using terminals 20A to 20F to audio signals that are electrical signals, and output the audio signals to terminals 20A to 20F, respectively.

Microphones 21A to 21F may have the same or similar functions. In this specification, if there is no need to distinguish microphones 21A to 21F from each other, the microphones may also be referred to as microphones 21.

Speakers 22A to 22F are connected to terminals 20A to 20F, respectively. Speakers 22A to 22F convert the audio signals that are electrical signals output from terminals 20A to 20F to the voices, and output the voices to external devices.

Speakers 22A to 22F may have the same or similar functions. In this specification, if there is no need to distinguish speakers 22A to 22F from each other, the speakers may also be referred to as speakers 22. Speakers 22 are not necessarily what are called "speakers" as long as functioning to convert the electrical signals to the voices, and may be what are called "earphones" or "headphones", for example.

Terminals 20A to 20F are connected to microphones 21A to 21F, speakers 22A to 22F, and network 30. Terminals 20A to 20F function to transmit the audio signals output from connected microphones 21A to 21F to the external devices connected to network 30. Terminals 20A to 20F also function to receive audio signals from the external devices connected to network 30, and output the received audio signals to speakers 22A to 22F, respectively. The external devices connected to network 30 include audio communication device 10.

Terminals 20A to 20F may have the same or similar functions. In this specification, if there is no need to distinguish terminals 20A to 20 from each other, the terminals may also be referred to as terminals 20. Terminals 20 may be PCs or smartphones, for example.

Terminal 20 may function as microphones 21, for example. In this case, microphones 21 are actually included in terminals 20, although terminals 20 seem to be connected to microphones 21 in FIG. 1. On the other hand, terminals 20 may function as speakers 22. In this case, speakers 22 are actually included in terminals 20, although terminals 20 seem to be connected to speakers 22 in FIG. 1. In addition, terminals 20 may further include input/output devices such as displays, touchpads, or keyboards.

Conversely, microphones 21 may function as terminals 20. In this case, terminals 20 are actually included in microphones 21, although terminals 20 seem to be connected to microphones 21 in FIG. 1. On the other hand, speakers 22 may function as terminals 20. In this case, terminals 20 are actually included in speakers 22, although terminals 20 seem to be connected to speakers 22 in FIG. 1.

Network 30 is connected to terminals 20A to 20F and a plurality of devices including audio communication device 10, and transfers signals among the connected devices. As will be described later, audio communication device 10 is server device 100. Accordingly, network 30 is connected to server device 100 serving as audio communication device 10.

Audio communication device 10 is connected to network 30, and is server device 100.

Figure 2:
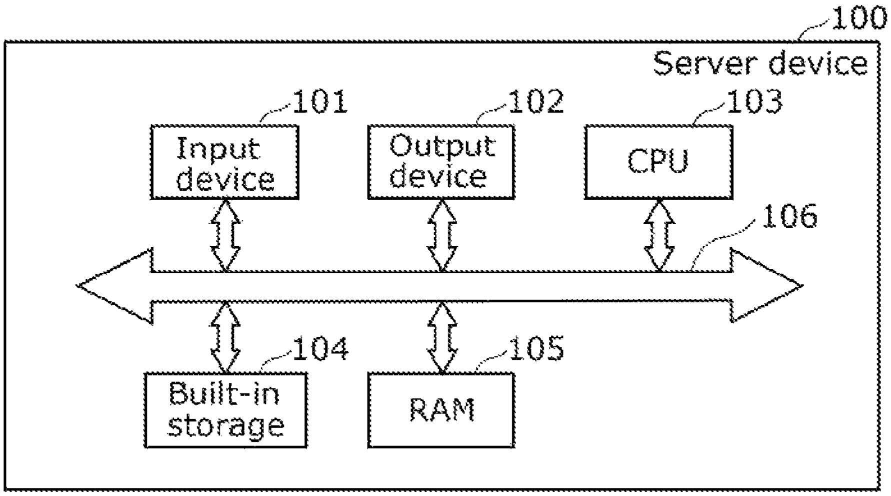
FIG. 2 is a schematic view showing an example configuration of a server device according to Embodiment 1.

FIG. 2 is a schematic view showing an example configuration of server device 100 serving as audio communication device 10.

As shown in FIG. 2, server device 100 includes input device 101, output device 102, central processing unit (CPU) 103, built-in storage 104, random access memory (RAM) 105, and bus 106.

Input device 101 serves as a user interface such as a keyboard, a mouse, or a touchpad, and receives the operations of the user of server device 100. Input device 101 may receive touch operations of the user, operations through voice, or remote operations using a remote controller, for example.

Output device 102 serves as a user interface such as a display, a speaker, or an output terminal, and outputs the signals of server device 100 to external devices.

Built-in storage 104 is a storage device such as a flash memory, and stores the programs to be executed by server device 100 or the data to be used by server device 100, for example.

RAM 105 is a storage device such as a static RAM (SRAM) or a dynamic RAM (DRAM) used in a temporary storage area, for example, when executing the programs.

CPU 103 makes, in RAM 105, copies of the programs stored in built-in storage 104, sequentially reads out the commands included in the copies from RAM 105, and executes the commands.

Bus 106 is connected to input device 101, output device 102, CPU 103, built-in storage 104, and RAM 105, and transfers signals among the connected constituent elements.

Although not shown in FIG. 2, server device 100 further has a communication function. With this communication function, server device 100 is connected to network 30.

Audio communication device 10 is, for example, CPU 103 that makes, in RAM 105, copies of the programs stored in built-in storage 104, sequentially reads out the commands included in the copies from RAM 105, and executes the commands.

Figure 3:
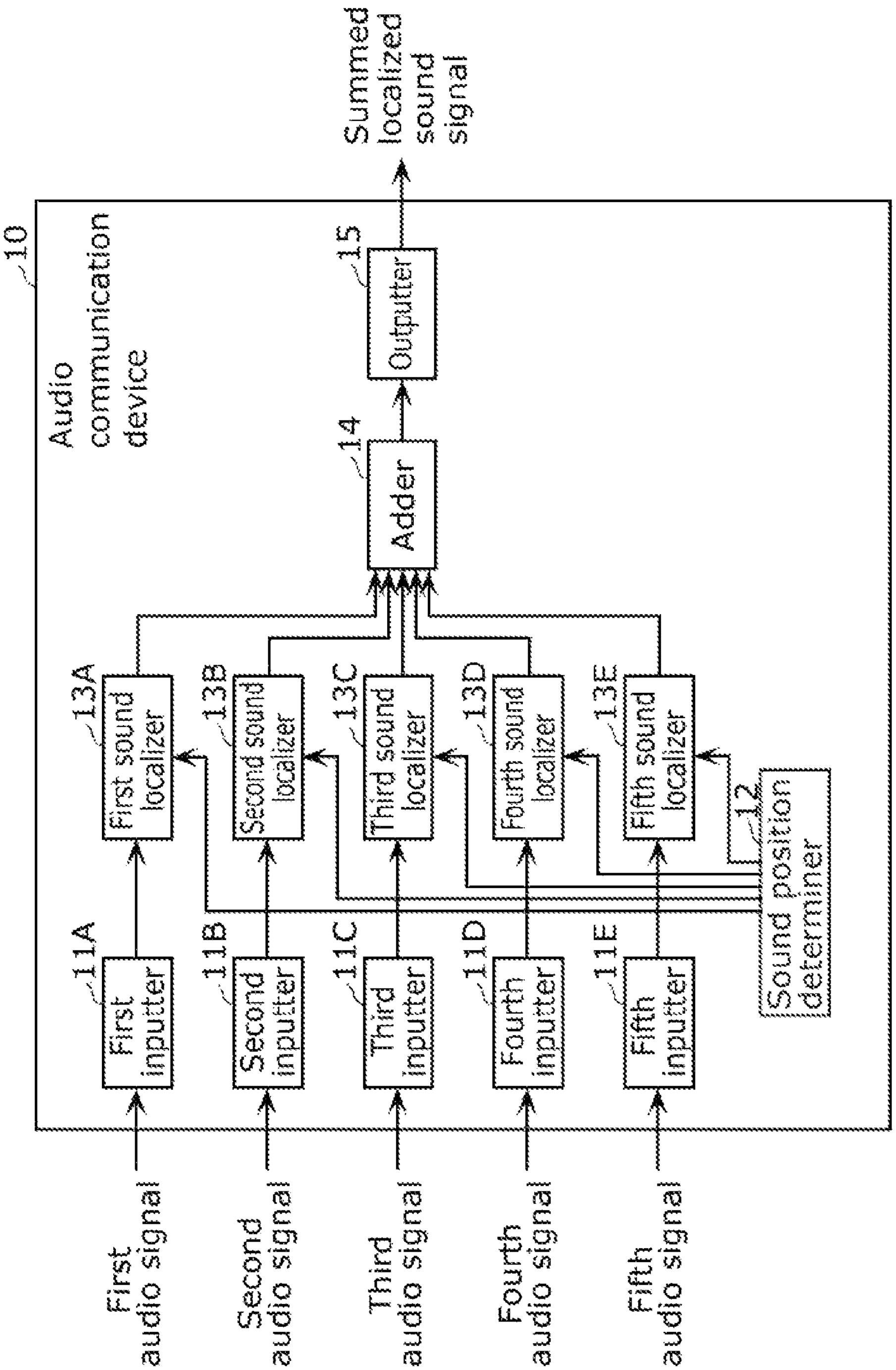
FIG. 3 is a block diagram showing an example configuration of an audio communication device according to Embodiment 1.

FIG. 3 is a block diagram showing an example configuration of audio communication device 10.

As shown in FIG. 3, audio communication device 10 includes N inputters 11, sound position determiner 12, N sound localizers 13, adder 14, and outputter 15. In FIG. 3, inputters 11 and sound localizers 13 correspond to first to fifth inputters 11A to 11E and first to fifth sound localizers 13A to 13E, respectively.

Each of first to fifth inputters 11A to 11E is connected to one of first to fifth sound localizers 13A to 13E and receives the audio signals output from any one of terminals 20. An example will be described here where the inputters receive the signals from the terminals as follows. First inputter 11A receives first audio signals output from terminal 20A. Second inputter 11B receives second audio signals output from terminal 20B. Third inputter 11C receives third audio signals output from terminal 20C. Fourth inputter 11D receives fourth audio signals output from terminal 20D. Fifth inputter 11E receives fifth audio signals output from terminal 20E. An example will be described here where the audio signals include the following signals. The first audio signals include the electrical signals obtained by converting the voice of the user (here, user 23A) of first terminal 20A. The second audio signals include the electrical signals obtained by converting the voice of the user (here, user 23B) of second terminal 20B. The third audio signals include the electrical signals obtained by converting the voice of the user (here, user 23C) of third terminal 20C. The fourth audio signals include the electrical signals obtained by converting the voice of the user (here, user 23D) of fourth terminal 20D. The fifth audio signals include the electrical signals obtained by converting the voice of the user (here, user 23E) of fifth terminal 20E.

First to fifth inputters 11A to 11E have the same or similar functions. In this specification, if there is no need to distinguish first to fifth inputters 11A to 11E from each other, the inputters may also be referred to as inputters 11.

Outputter 15 is connected to adder 14, and outputs, to any of terminal 20, summed localized sound signals, which will be described later, output from adder 14. An example will be described here where outputter 15 outputs the summed localized sound signals to terminal 20F.

Sound position determiner 12 is connected to first to fifth sound localizers 13A to 13E. Sound position determiner 12 determines, for N audio signals input from N inputters 11, sound localization positions in a virtual space having first and second walls 41 and 42 (see FIG. 4, which will be described later). In FIG. 3, the audio signals correspond to the first to audio signals.

Figure 4:
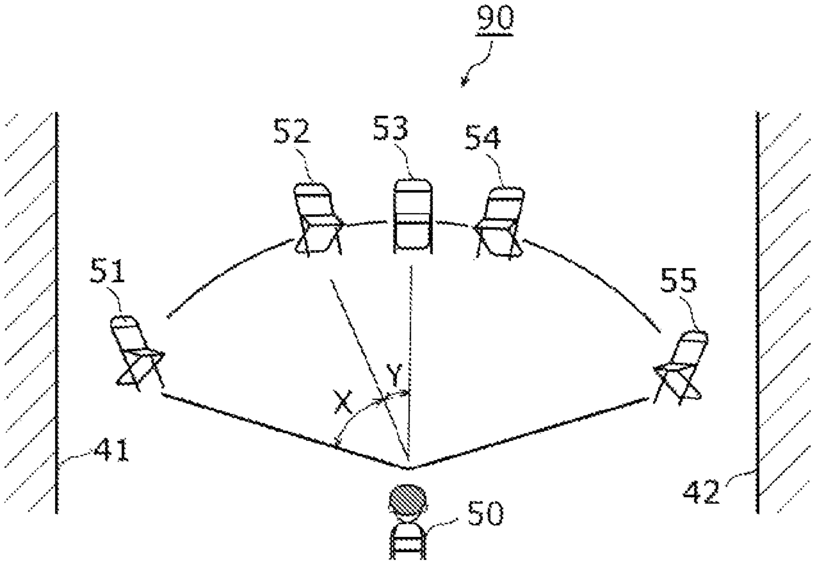
FIG. 4 is a schematic view showing an example where a sound position determiner according to Embodiment 1 determines sound localization positions.

FIG. 4 is a schematic view showing that sound position determiner 12 determines, for the N respective audio signals, the sound localization positions in the virtual space.

As shown in FIG. 4, virtual space 90 includes first wall 41, second wall 42, first sound position 51, second sound position 52, third sound position 53, fourth sound position 54, fifth sound position 55, and hearer position 50.

First wall 41 and second wall 42 are virtual walls present in the virtual space to reflect sound waves.

Hearer position 50 is the position of a virtual hearer of the voices indicated by the first to fifth audio signals.

First sound position 51 is the sound position determined for the first audio signals by sound position determiner 12. Second sound position 52 is the sound position determined for the second audio signals by sound position determiner 12. Third sound position 53 is the sound position determined for the third audio signals by sound position determiner 12. Fourth sound position 54 is the sound position determined for the fourth audio signals by sound position determiner 12. Fifth sound position 55 is the sound position determined for the fifth audio signals by sound position determiner 12.

As shown in FIG. 4, sound position determiner 12 determines the sound localization positions (here, first to fifth sound positions 51 to 55) of the N sound signals to fall between first wall 41 and second wall 42 and to not overlap each other as viewed from hearer position 50. More specifically, sound position determiner 12 determines the sound localization positions of the N sound signals as follows. Assume that the front of a hearer virtually present at hearer position 50 is zero degrees. In this case, the distance between adjacent ones of the sound localization positions including or sandwiching the zero degrees needs to be shorter than the distance between adjacent ones of the sound localization positions without including or sandwiching the zero degrees.

Accordingly, as shown in FIG. 4, X is greater than Y, where X is the angle between first and second sound positions 51 and 52 as viewed from hearer position 50, whereas Y is the angle between second and third sound positions 52 and 53 as viewed from hearer position 50.

Referring back to FIG. 3, the description of audio communication device 10 will be continued.

First sound localizer 13A is connected to first inputter 11A, sound position determiner 12, and adder 14. First sound localizer 13A performs sound localization processing to localize the sound in first sound position 51 determined by sound position determiner 12, and outputs localized sound signals. Second sound localizer 13B is connected to second inputter 11B, sound position determiner 12, and adder 14. Second sound localizer 13B performs sound localization processing to localize the sound in second sound position 52 determined by sound position determiner 12, and outputs localized sound signals. Third sound localizer 13C is connected to third inputter 11C, sound position determiner 12, and adder 14. Third sound localizer 13C performs sound localization processing to localize the sound in third sound position 53 determined by sound position determiner 12, and outputs localized sound signals. Fourth sound localizer 13D is connected to fourth inputter 11D, sound position determiner 12, and adder 14. Fourth sound localizer 13D performs sound localization processing to localize the sound in fourth sound position 54 determined by sound position determiner 12, and outputs localized sound signals. Fifth sound localizer 13E is connected to fifth inputter 11E, sound position determiner 12, and adder 14. Fifth sound localizer 13E performs sound localization processing to localize the sound in fifth sound position 55 determined by sound position determiner 12, and outputs localized sound signals.

First to fifth sound localizers 13A to 13E have the same or similar functions. In this specification, if there is no need to distinguish first to fifth sound localizers 13A to 13E from each other, the sound localizers may also be referred to as sound localizers 13.

More specifically, each sound localizer 13 performs the sound localization processing using first and second head-related transfer function (HRTFs). The first HRTFs assume that the sound waves emitted from the sound position determined by sound position determiner 12 directly reach both the ears of a hearer virtually present at hearer position 50. The second HRTFs assume that the sound waves emitted from the sound position determined by sound position determiner 12 reach both the ears of a hearer virtually present at hearer position 50 after being reflected by closer one of first wall 41 and second wall 42.

Figure 5:
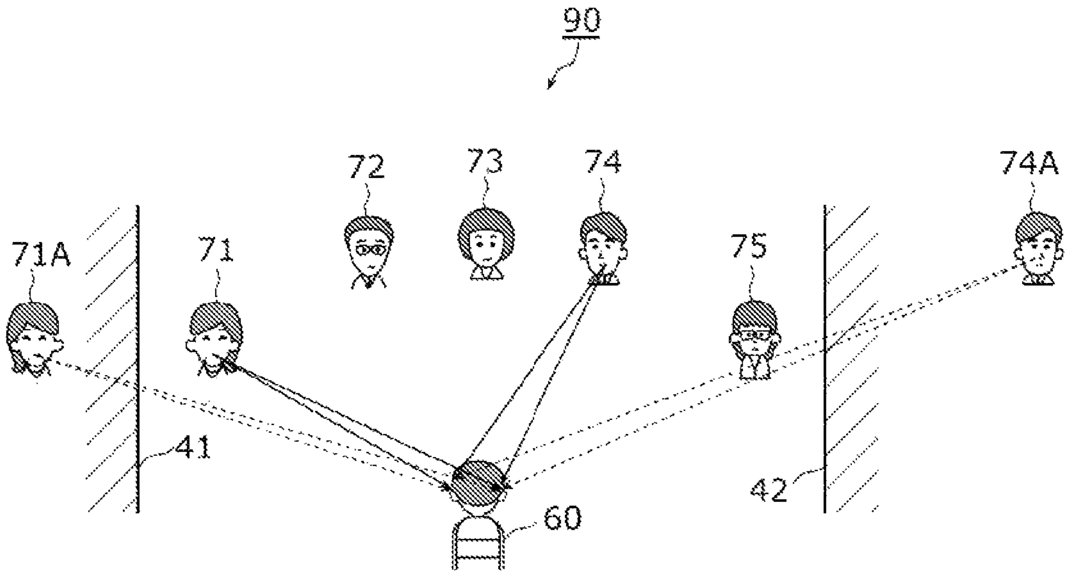
FIG. 5 is a schematic view showing an example where each sound localizer according to Embodiment 1 performs sound localization processing.

FIG. 5 is a schematic view showing that each sound localizer 13 performs the sound localization processing.

In FIG. 5, speaker 71 is virtually present in first sound position 51. Speaker 72 is virtually present in second sound position 52. Speaker 73 is virtually present in third sound position 53. Speaker 74 is virtually present in fourth sound position 54. Speaker 75 is virtually present in fifth sound position 55. Hearer 60 is virtually present at hearer position 50.

Speaker 71 may be, for example, an avatar of user 23A. Speaker 72 may be, for example, an avatar of user 238. Speaker 73 may be, for example, an avatar of user 23C. Speaker 74 may be, for example, an avatar of user 23*d*. Speaker 75 may be, for example, an avatar of user 23E. Hearer 60 may be, for example, an avatar of user 23F.

Speaker 71A is a reflection of speaker 71 virtually present in the mirror position of first wall 41 as a mirror. Speaker 74A is a reflection of speaker 74 virtually present in the mirror position of second wall 42 as a mirror.

As shown in FIG. 5, in virtual space 90, for example, the voice of first speaker 71 passes through the transfer paths indicated by the two solid lines, and directly reaches both the ears of hearer 60. In addition, the voice of first speaker 71 passes through the transfer paths indicated by the two broken lines, and reaches both the ears of the hearer after being reflected by first wall 41.

Assume that hearer 60 receives the sum of the following four signals using headphones, for example, in virtual space 90. Two signals are generated by convolving the voice of first speaker 71 with the first HRTFs corresponding to the transfer paths indicated by the two solid lines. Two signals are generated by convolving the voice with the second HRTFs corresponding to the transfer paths indicated by the two broken lines. Hearer 60 then hears the voice as if it were uttered by first speaker 71 in the first sound position. At this time, hearer 60 also hears the voice reflected by first wall 41 and thus feels virtual space 90 as a virtual space having walls.

As shown in FIG. 5, in virtual space 90, for example, the voice of fourth speaker 74 passes through the transfer paths indicated by the two solid lines, and directly reaches both the ears of hearer 60. In addition, the voice of fourth speaker 74 passes through the transfer paths indicated by the two broken lines, and reaches both the ears of the hearer after being reflected by second wall 42.

Assume that hearer 60 receives the sum of the following four signals using headphones, for example, in virtual space 90. Two signals are generated by convolving the voice of fourth speaker 74 with the first HRTFs corresponding to the transfer paths indicated by the two solid lines. Two signals are generated by convolving the voice with the second HRTFs corresponding to the transfer paths indicated by the two broken lines. Hearer 60 then hears the voice as if it were uttered by fourth speaker 74 in the fourth sound position. At this time, hearer 60 also hears the voice reflected by second wall 42 and thus feels virtual space 90 as a virtual space having walls.

At this time, each sound localizer 13 may perform the sound localization processing so that at least one of the reflectances of first and second walls 41 and 42 to the sound waves is changeable. By changing the reflectance(s), the degrees of echoing the voices in virtual space 90 are changeable.

At this time, each sound localizer 13 may perform the sound localization processing so that at least one of the positions of first and second walls 41 and 42 is changeable. By changing the position(s) of the wall(s), the spread of virtual space 90 is changeable.

Needless to mention, sound localizers 13 may further perform voice processing using third HRTFs. The third HRTFs assume that the sound waves emitted from the sound position determined by sound position determiner 12 reach both the ears of hearer 60 after being reflected by farther one of first wall 41 and second wall 42.

Referring back to FIG. 3, audio communication device 10 will be continuously described.

Adder 14 is connected to N sound localizers 13 and outputter 15, sums N localized sound signals output from N sound localizers 13, and outputs summed localized sound signals.

Audio communication device 10 described above causes the voices of N (here, five) speakers input from N (here, five) inputters 11 to sound as if the voices were uttered in virtual space 90 having first and second walls 41 and 42. In addition, audio communication device 10 described above allows hearer 60 of the voices of the N speakers to relatively easily grasp the positional relationship between the speakers and the walls in virtual space 90. Thus, hearer 60 relatively easily distinguishes the directions from which the voices of the N speakers are coming. Accordingly, audio communication device 10 described above gives a more realistic feeling to the participants in a teleconference, a Web drinking party, or any other event held utilizing the audio communication device than a typical audio communication device.

As described above, it is generally known that the difference limen in sound localization is higher at the front of a hearer, and decreases with increasing distances to the right and left. In audio communication device 10 described above, the angles between speakers on the right and left are greater than the angle between speakers at the front, as seen from hearer 60. Thus, hearer 60 relatively easily distinguishes the directions from which the voices of the N speakers are coming. Accordingly, audio communication device 10 described above gives a more realistic feeling to the participants in a teleconference, a Web drinking party, or any other event held utilizing the audio communication device than a typical audio communication device.

Embodiment 2

Now, an audio communication device according to Embodiment 2 will be described whose configuration is partially modified from the configuration of audio communication device 10 according to Embodiment 1.

In the following description of the audio communication device according to Embodiment 2, the same reference characters as are used to represent equivalent elements as those of audio communication device 10 which have already been described, and the detailed explanation thereof will be omitted. The differences from audio communication device 10 will be described mainly.

Figure 6:
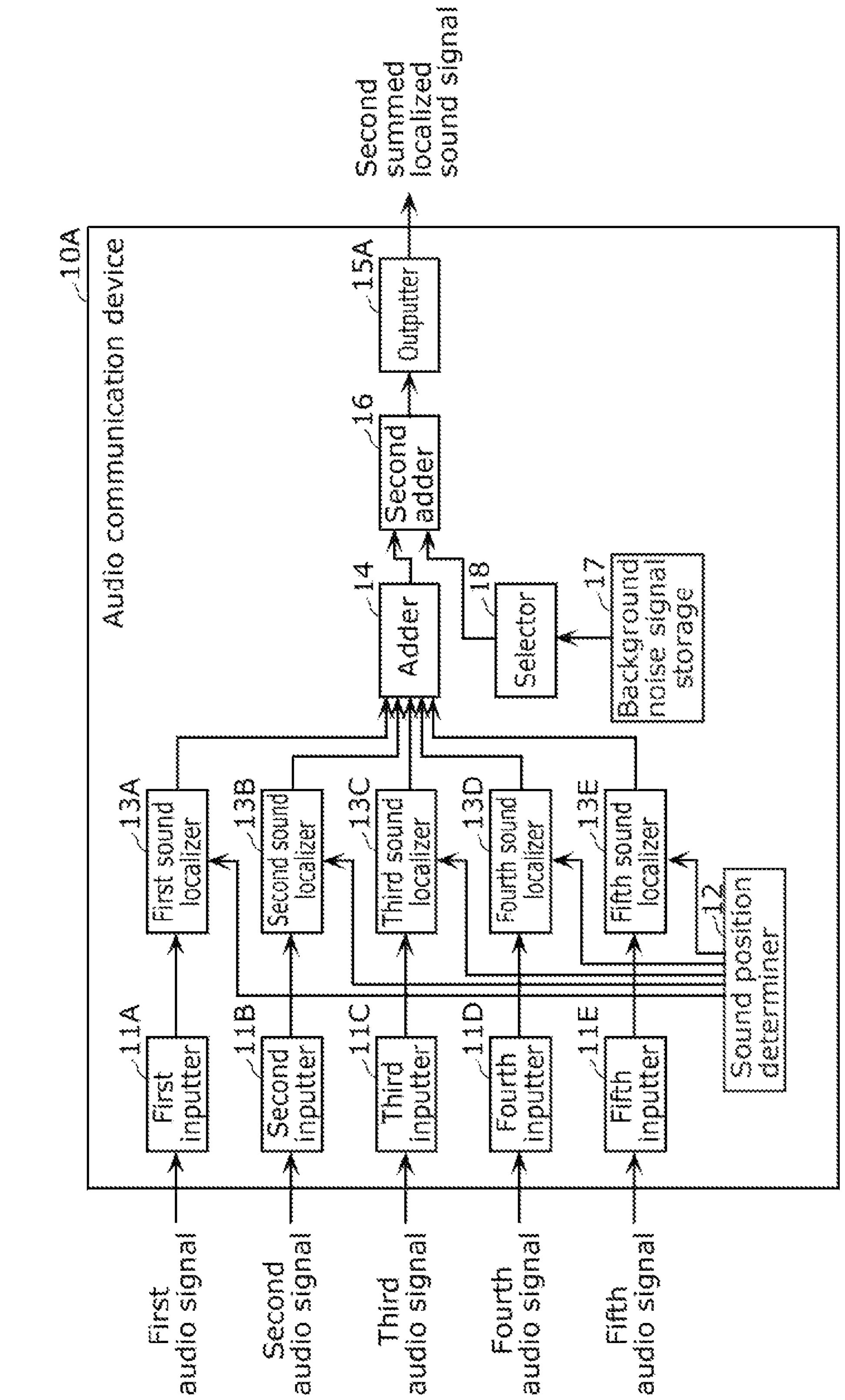
FIG. 6 is a block diagram showing an example configuration of an audio communication device according to Embodiment 2.

FIG. 6 is a block diagram showing an example configuration of audio communication device 10A according to Embodiment 2.

As shown in FIG. 6, unlike audio communication device 10, audio communication device 10A according to Embodiment 2 further includes second adder 16, background noise signal storage 17, and selector 18; and includes outputter 15A in place of outputter 15.

Background noise signal storage 17 is connected to selector 18, and stores one or more background noise signals indicating the background noise in virtual space 90.

The background noise indicated by the background noise signals may be, for example, the dark noise recorded in advance in a real conference room. The background noise indicated by the background noise signals may be the noise of hustle and bustle recorded in advance, for example, at a real bar, pub, or live music club. The background noise indicated by the background noise signals is jazz music played, for example, at a real jazz café. The background noise may be indicated by, as the background noise signals, for example, artificially synthesized signals, or artificial signals generated by synthesizing the noises of hustle and bustle recorded in advance in real spaces, for example.

Selector 18 is connected to background noise signal storage 17 and second adder 16, and selects one or more out of the one or more background noise signals stored in background noise signal storage 17.

Selector 18 may change the background noise signal(s) to be selected over time, for example.

Second adder 16 is connected to adder 14, selector 18, and outputter 15A. Second adder 16 sums the summed localized sound signals output from adder 14 and the background noise signal(s) selected by selector 18, and outputs second summed localized sound signals.

Outputter 15A is connected to second adder 16, and outputs, to any of terminals 20, the second summed localized sound signals output from second adder 16. An example will be described here where outputter 15A outputs the second summed localized sound signals to terminal 20F.

Audio communication device 10A described above causes the voices of N (here, five) speakers input from N (here, five) inputters 11 to sound as if the voices were uttered in virtual space 90 filled with background noise. For example, if selector 18 selects a background noise signal indicating the dark noise recorded in advance in a real conference room, audio communication device 10A makes virtual space 90 appear as if it were the real conference room. For example, if selector 18 selects a background noise signal indicating the noise of hustle and bustle recorded in advance at a real bar, pub, or live music club, for example, audio communication device 10A makes virtual space 90 appear as if it were at a real bar, pub, or live music club, for example. For example, if selector 18 selects a background noise signal indicating the jazz music played at a real jazz café, audio communication device 10A makes virtual space 90 appear as if it were the real jazz café. Accordingly, audio communication device 10A described above gives a more realistic feeling to the participants in a teleconference, a Web drinking party, or any other event held utilizing the audio communication device than a typical audio communication device.

Audio communication device 10A described above selects the background noise in accordance with the ambience of virtual space 90 to be created.

Audio communication device 10A described above changes, over time, the ambience of virtual space 90 to be created.

Other Embodiments

The audio communication device according to the present disclosure has been described above based on Embodiments 1 and 2. The present disclosure is not limited to these embodiments. For example, the constituent elements written in this specification may be freely combined or partially excluded to form another embodiment of the present disclosure. The present disclosure includes other variations, such as those obtained by variously modifying the embodiments as conceived by those skilled in the art without departing from the scope and spirit of the present disclosure, that is, the meaning of the wording in the claims.

(1) The example configurations of audio communication devices 10 and 10A have been described in Embodiments 1 and 2 where N is five. However, in the configuration of the audio communication device according to the present disclosure, N is not necessarily five, as long as being an integer of two or more.

(2) Audio communication device 10 has been described in Embodiment 1 where the first to fifth audio signals are input from terminals 20A to 20E, respectively, and where the summed localized sound signals are output to terminal 20F. Alternatively, audio communication device 10 may be modified to obtain the following audio communication devices according to first to fifth variations. In the audio communication device according to the first variation, the first to fifth audio signals are input from terminals 20B to 20F, respectively, and the summed localized sound signals are output to terminal 20A. In the audio communication device according to the second variation, the first to fifth audio signals are input from terminals 20C to 20F and 20A, respectively, and the summed localized sound signals are output to terminal 20B. In the audio communication device according to the third variation, the first to fifth audio signals are input from terminals 20D to 20F, 20A, and 20B, respectively, and the summed localized sound signals are output to terminal 20C. In the audio communication device according to the fourth variation, the first to fifth audio signals are input from terminals 20E, 20F, and 20A to 20C, respectively, and the summed localized sound signals are output to terminal 20D. In the audio communication device according to the fifth variation, the first to fifth audio signals are input from terminals 20F and 20A to 20D, respectively, and the summed localized sound signals are output to terminal 20E.

Server device 100 may be audio communication device 10 and the audio communication devices according to the first to fifth variations at once. For example, server device 100 may serve as audio communication device 10 and the audio communication devices according to the first to fifth variations at once through time-sharing or parallel processing.

Server device 100 may be a single audio communication device that fulfills the functions obtained when serving as audio communication device 10 and the audio communication devices according to the first to fifth variations at once.

(3) Audio communication device 10A has been described in Embodiment 2 where the first to fifth audio signals are input from terminals 20A to 20E, respectively, and where the second summed localized sound signals are output to terminal 20F. Alternatively, audio communication device 10A may be modified to obtain the following audio communication devices according to sixth to tenth variations. In the audio communication device according to the sixth variation, the first to fifth audio signals are input from terminals 20B to 20F, respectively, and the second summed localized sound signals are output to terminal 20A. In the audio communication device according to the seventh variation, the first to fifth audio signals are input from terminals 20C to 20F and 20A, respectively, and the second summed localized sound signals are output to terminal 20B. In the audio communication device according to the eighth variation, the first to fifth audio signals are input from terminals 20D to 20F, 20A, and 20B, respectively, and the second summed localized sound signals are output to terminal 20C. In the audio communication device according to the ninth variation, the first to fifth audio signals are input from terminals 20E, 20F, and 20A to 20C, respectively, and the second summed localized sound signals are output to terminal 20D. In the audio communication device according to the tenth variation, the first to fifth audio signals are input from terminals 20F and 20A to 20D, respectively, and the second summed localized sound signals are output to terminal 20E.

Server device 100 may be audio communication device 10A and the audio communication devices according to the sixth to tenth variations at once. For example, server device 100 may serve as audio communication device 10A and the audio communication devices according to the sixth to tenth variations at once through time-sharing or parallel processing. At this time, selectors 18 included in audio communication device 10A and the audio communication devices according to the sixth to tenth variations may select the same background noise signal. Accordingly, participants have a more realistic feeling at a teleconference, a Web drinking party, or any other event held utilizing the audio communication device.

Server device 100 may be a single audio communication device that fulfills the functions when serving as audio communication device 10A and the audio communication devices according to the sixth to tenth variations at once.

(4) Some or all of the constituent elements of each of audio communication devices 10 and 10A may serve as a single system large-scale integrated (LSI) circuit. The system LSI circuit is a super multifunctional LSI circuit manufactured by integrating a plurality of components on a single chip, and specifically is a computer system including a microprocessor, a read-only memory (ROM), and a random-access memory (RAM), for example. The RAM stores computer programs. The microprocessor operates in accordance with the computer programs so that the system LSI circuit fulfills its functions.

While the system LSI circuit is named here, the integrated circuit may be referred to an IC, an LSI circuit, a super LSI circuit, or an ultra-LSI circuit depending on the degree of integration. The circuit integration is not limited to the LSI. The devices may be dedicated circuits or general-purpose processors. A field programmable gate array (FPGA) programmable after the manufacture of an LSI circuit or a reconfigurable processor capable of reconfiguring the connections and settings of circuit cells inside an LSI may be employed.

Appearing as an alternative circuit integration technology to the LSI, another technology that progresses or deprives from the semiconductor technology may be used for integration of functional blocks. Biotechnology is also applicable.

(5) The constituent elements of audio communication devices 10 and 10A may consist of dedicated hardware or a program executor such as a CPU or a processor that reads out software programs stored in a recording medium such as a hard disk or a semiconductor memory and executes the read-out programs.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is widely applicable to a teleconference system, for example.

The invention claimed is:

1. An audio communication device, comprising:

N inputters, where N is an integer of two or more, each receiving one of N audio signals;

a sound position determiner that determines, for the N audio signals input from the N inputters, sound localization positions in a virtual space having a first wall and a second wall;

N sound localizers, each associated with one of the N inputters, performing sound localization processing to localize sound in one of the sound localization positions determined for one of the N inputters associated with the sound localizer by the sound position determiner, and outputting one of N localized sound signals; and an adder that sums the N localized sound signals output from the N sound localizers, and outputs a summed localized sound signal, wherein the sound position determiner determines the sound localization positions of the N audio signals to fall between the first wall and the second wall, and to not overlap each other as viewed from a hearer position between the first wall and the second wall, each of the N sound localizers performs the sound localization processing using:

a first head-related transfer function assuming that a sound wave emitted from a sound localization position determined for the sound localizer by the sound position determiner directly reaches each ear of a hearer virtually present at the hearer position; and a second head-related transfer function assuming that the sound wave emitted from the sound localization position reaches each ear of the hearer after being reflected by closer one of the first wall and the second wall, and each of the first wall and the second wall is a virtual wall present in the virtual space to reflect the sound wave.

2. The audio communication device according to claim 1, wherein each of the N sound localizers performs the sound localization processing while allowing a change in at least one of a reflectance of the first wall to the sound wave or a reflectance of the second wall to the sound wave.

3. The audio communication device according to claim 1, wherein each of the N sound localizers performs the sound localization processing while allowing a change in at least one of a position of the first wall or a position of the second wall.

* * * * *